(12) United States Patent
Glenn

(10) Patent No.: US 7,475,950 B1
(45) Date of Patent: Jan. 13, 2009

(54) MOTORCYCLE WHEEL ASSEMBLY

(76) Inventor: Aaron L. Glenn, 109 S. Nelson Dr., Mustang, OK (US) 73064

( * ) Notice: Subject to any disclaimer, the term of this patent is extended or adjusted under 35 U.S.C. 154(b) by 19 days.

(21) Appl. No.: 11/784,575

(22) Filed: Apr. 6, 2007

(51) Int. Cl.
*B60B 19/00* (2006.01)
*B60B 3/10* (2006.01)
*B60T 1/06* (2006.01)

(52) U.S. Cl. .................... 301/6.8; 301/6.9; 301/64.203; 188/17

(58) Field of Classification Search ................. 301/6.8, 301/6.9, 110.5, 64.201, 64.202, 64.203, 64.301, 301/64.302, 64.303, 64.305, 64.306; 152/DIG. 10; 180/219, 264; 280/279, 280, 288; 188/17, 188/73.1, 218 XL, 24.22; 303/9.64
See application file for complete search history.

(56) References Cited

U.S. PATENT DOCUMENTS

| | | | | |
|---|---|---|---|---|
| 612,401 | A * | 10/1898 | Colmer | 384/545 |
| 2,352,829 | A * | 7/1944 | Forbes | 188/366 |
| 2,381,166 | A * | 8/1945 | Hollerith | 188/366 |
| 2,671,532 | A * | 3/1954 | Du Bois | 188/18 A |
| 3,776,597 | A * | 12/1973 | Camps | 301/6.9 |
| 3,899,049 | A * | 8/1975 | Martin | 188/18 A |
| 3,931,871 | A * | 1/1976 | Martin | 188/344 |
| 4,159,832 | A * | 7/1979 | Inbody | 280/124.126 |
| 4,651,970 | A * | 3/1987 | Sadler | 251/63.6 |
| 5,732,798 | A * | 3/1998 | Toson | 188/18 A |
| 6,899,400 | B1 | 5/2005 | Cook | |
| 6,918,467 | B2 | 7/2005 | Kasten | |
| 2007/0290549 | A1* | 12/2007 | Zabaleta | 301/95.11 |

FOREIGN PATENT DOCUMENTS

EP 382683 A2 * 8/1990
FR 2418382 A * 10/1979

OTHER PUBLICATIONS

Axle Extenders for Multi-speed bikes are now available! (fatwheels.com) http://web.archive.org/web/20010124014900/fatwheels.com/aslex.htm 1 page, Jan. 24, 2001.*

* cited by examiner

*Primary Examiner*—Jason R Bellinger
*Assistant Examiner*—Kip T Kotter
(74) *Attorney, Agent, or Firm*—Randal D. Homburg

(57) ABSTRACT

A wheel assembly for a motorcycle provides two wheel and hub assemblies which are attached together along the outer rim of the mated and aligned hubs, providing a space between the two hubs along the axle for insertion of a brake rotor and brake mechanism within the wheel assembly while also providing the brake fluid flow through axle, partially concealing the brake and rotor within the wheel assembly instead of having the brake rotor and mechanism on the outside of a motorcycle wheel.

3 Claims, 5 Drawing Sheets

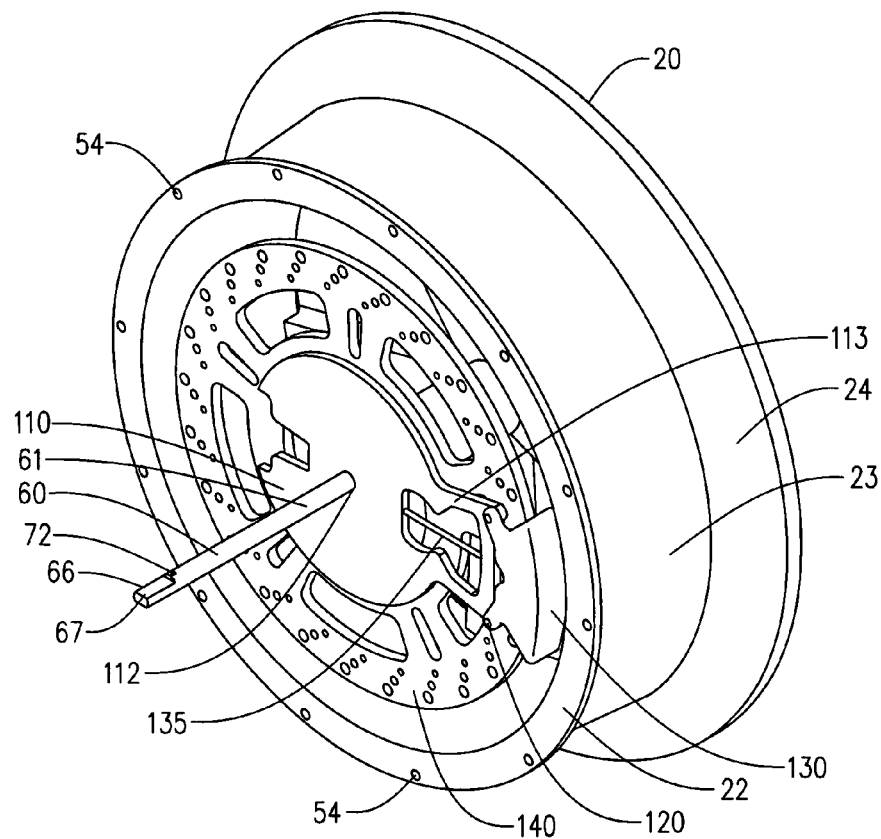

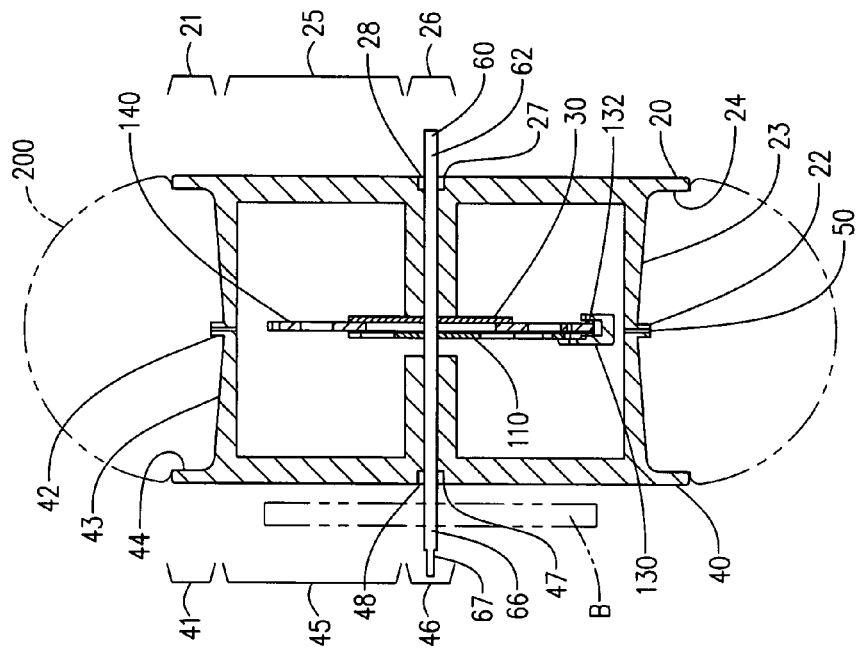
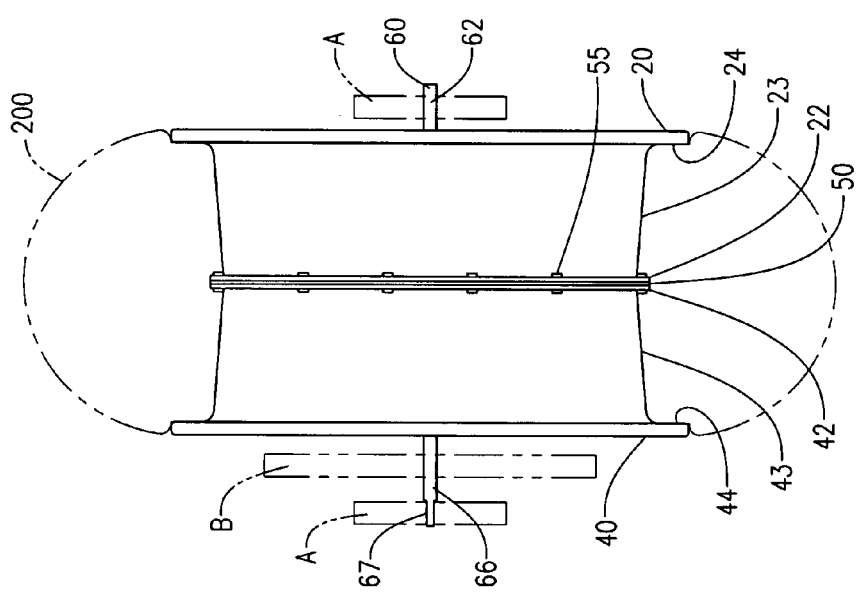

MOTORCYCLE WHEEL ASSEMBLY

CROSS REFERENCE TO RELATED APPLICATIONS

None

BACKGROUND OF THE INVENTION

1. Field of Invention

A wheel assembly for a motorcycle provides two wheel and hub assemblies which are attached together along the outer rim of the mated and aligned hubs, providing a space between the two hubs along the axle for insertion of a brake rotor and brake mechanism within the wheel assembly while also providing the brake fluid flow through axle, partially concealing the brake and rotor within the wheel assembly instead of having the brake rotor and mechanism on the outside of a motorcycle wheel.

2. Description of Prior Art

The following United States patents were discovered and are disclosed within this application for utility patent. All relate to motorcycle wheels and brake mechanisms.

U.S. Pat. No. 6,899,400 to Cook discloses a two piece motorcycle wheel having two wheel sections bolted together over an independent rotating spinner component, each wheel component having a hub portion, a rim portion and a spoke portion wherein each wheel section when bolted together forms a complete wheel. A space defined between the two wheel section allows for the independent rotation of a spinner component mounted on an axle to rotate freely between the two wheel sections, freewheeling between the assemble wheel section.

U.S. Pat. No. 6,918,467 to Kasten provides a counter-rotating brake disc for a motorcycle wheel assembly to cancel out any gyroscopic force created by rotation of the wheels, limit the amount of additional weight required to be added to a motorcycle to cancel these forces and increase control and safety by eliminating the gyroscopic forces, accomplished by having the disclosed wheel providing a wheel assembly having a wheel axle carried by the motorcycle, a brake hub rotatably carried by the wheel axle, a tire hub rotatably carried by the brake hub for carrying a tire, and the brake hub and the tire hub constructed and arranged to rotate opposite by means of a center gear, transfer gear, and ring gear disposed between the brake hub and tire hub to cooperate to rotate the brake hub and tire hub in opposite directions during travel.

In U.S. Pat. No. 5,732,798 to Toson, a disc brake system for a front motorcycle wheel is disclosed, the brake including a peripheral annular disc arranged such that its caliper reaction passes through a fixed axle coaxial with the wheel axis, the caliper mounted to the end of a radial arm rigidly connected to the axle engages the disc when activated, the brake system defining a wheel support, and rim for retaining a tire on an outer surface, a fixed axle upon which the wheel is able to rotate, a coupling means to prevent rotation of the axle with respect to the wheel support, and annular disc surrounding the axle without contact with the axle mounted directly to an inner surface of the rim, and elongated radial arm mounted to the axle and a caliper mounted to the radial arm positioned in a manner allowing engagement with the annular disc.

The present wheel assembly is presented for both front and rear wheels of a motorcycle or other wheeled vehicle providing two wheel segments, each forming half of a wheel defining a hub portion, a spoke portion and a rim portion, the rim portion further defining a central connector flange having a plurality of internally threaded bores, the internally threaded bores on each respective flange being aligned to connect each wheel component together forming complete wheel upon which a tire is installed and inflated. A central cavity is defined between the hub portions of the two wheel components, each hub portion further providing a central axle bore for mounting upon a modified axle having a bearing surfaces upon which the central axle bore is installed, the modified fixed axle attached to aligned axle supports of a motorcycle frame.

A complete brake assembly may be installed upon the modified fixed axle between the two wheel components in the central cavity, distinguishing the present motorcycle wheel assembly from the prior art by placement of the brake assembly between the spoke portion of the wheel assembly between the two wheel sections, the prior art disclosing the rotor and brake calipers on the outer surfaces of the present motorcycle wheel instead of being contained within a motorcycle wheel.

SUMMARY OF THE INVENTION

Motorcycle wheels have primarily gone unchanged since their introduction into the market several years ago. Motorcycle wheels comprise a hub attached to an axle connected to a frame, with spokes emanating from the hub to an outer wheel surface having a perimeter upon which a tire is mounted. The brake rotor is mounted on the outside of the wheel hub and the brake mechanism is supported by the motorcycle frame, most commonly brake calipers that capture the brake rotor, slowing the rotation of the wheel. This occurs on the front and rear wheels of the motorcycle. The only modification to this general wheel assembly occurs in the aesthetics of the spokes or the width of the motorcycle outer wheel surface varied by the width of the tire. The rim brake rotor is on the outside of the wheel, obstructing a portion of the view of the wheel from one side or the other.

The present motorcycle wheel provides two sections each defining a hub portion, spoke portion, and rim portion, assembled together along an inner cooperative margin of each wheel segment with mated extending flanges bolted together leaving a space between the two hub segments, allowing for the placement of the brake rotor between the two hub segments for a full view of the wheel from both sides of the wheel. Other components of the brake assembly or perhaps the drive mechanism of the rear wheel may also be placed between the two hub segments in the space provided by this two section wheel assembly.

The primary objective of the invention is to provide a two section wheel assembly forming a space between two hub segments within which a brake assembly may be placed to allow a full view of both sides of the wheel assembly for aesthetic purposes. A second objective is to provide the two section wheel assembly to be disassembled for access to the brake assembly for maintenance and repair, and to protect the brake rotor on the brake assembly between the two wheel sections.

DESCRIPTION OF THE DRAWINGS

The following formal drawings are submitted with this utility patent application.

FIG. 3 is an inner perspective view of the first wheel component of the wheel assembly with a brake assembly mounted upon the axle.

FIG. 4 is a top view of the wheel assembly.

FIG. 6 is an exploded view of the wheel assembly including a brake assembly engaged between the two wheel components.

DESCRIPTION OF THE PREFERRED EMBODIMENT

Figure 1:
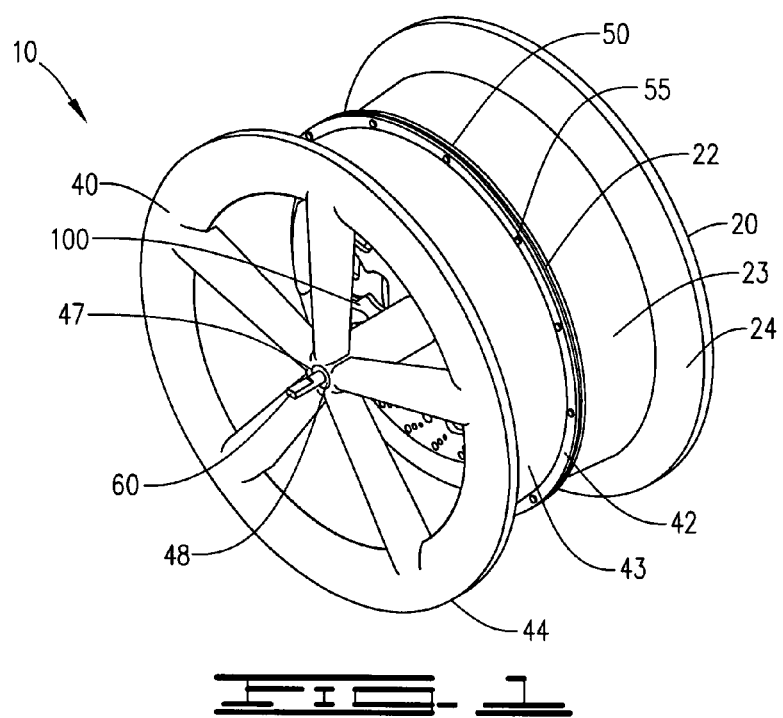
FIG. 1 is a perspective view of the subject wheel assembly.
Figure 2:
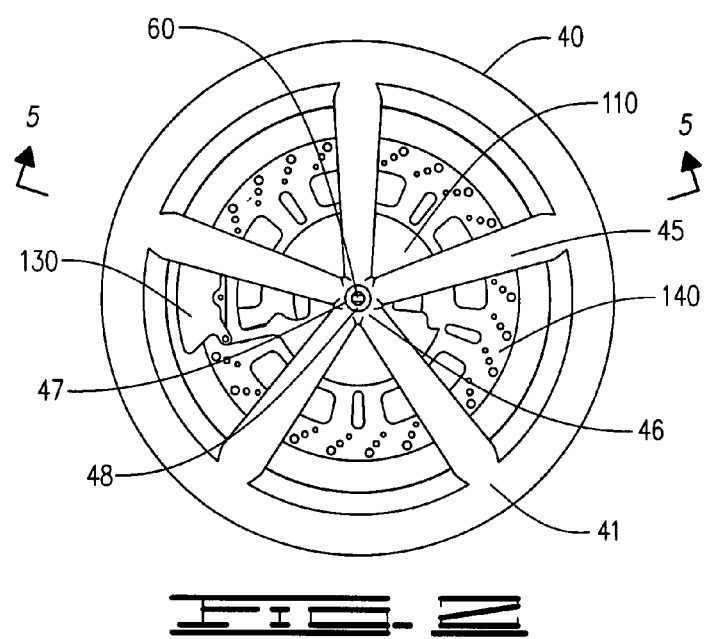
FIG. 2 is a side view of the wheel assembly.

A wheel assembly 10, FIGS. 1-8, primarily for use on a motorcycle, comprises a first wheel segment 20 defining a rim portion 21 having a first inner connecting flange 22, an inner rim surface 23 and an outer retaining flange 24, a spoke portion 25 and a hub portion 26 having an axle bore 27 and a first axle bearing 28, a second wheel segment 40 defining a rim portion 41 having a second inner connecting flange 42, an inner rim surface 43 and an outer retaining flange 44, a spoke portion 45 and a hub portion 46 having an axle bore 47 and a second axle bearing 48, and an axle 60 defining a neck 61, a first end 62 providing a first axle mounting bolt bore 65, and a second end 66 having a flattened portion 67 and providing a second axle mounting bore 68, the first wheel segment 20 attached to the second wheel segment 40 along the first and second inner connecting flanges 22, 42 by a plurality of flange bolts 55 attaching through a plurality of aligned flange holes 54 in each inner connecting flange with the axle 60 passing through the aligned axle bores 27, 47 of each first and second wheel segments 20, 40, through the first and second axle bearings 28, 48 set within each axle bore 27, 47, the first and second ends 62, 66 of the axle 60 adapted to be attached to a chassis or motorcycle frame A, FIG. 4, having a tire 200 applied upon the inner rim surfaces 23, 43 of the assembled wheel assembly 10 between the two outer retaining flanges 24, 44 of the assembled first and second wheel segments 20, 40. The first and second inner connecting flanges 22, 42 may provide a flange plate 50 between them to provide an air-tight seal between the first and second inner connecting flanges 22, 42 to eliminate any potential air loss from the tire 200 mounted upon the wheel assembly 10, FIG. 6.

In a preferred embodiment, a brake assembly 100 is attached upon the axle 60 between the hub portions 26, 46 of the first and second wheel segments 20, 40 prior to assembly providing the brake assembly 100 within the two wheel segments, FIGS. 1-3 and 5-7. In this preferred embodiment, the first end 62 of the axle 60 provides an extension bore 63 within which is attached a first end extension 64 having the first axle mounting bolt bore 65, the neck 61 including a brake fluid channel 70 having an outer channel bore 72 within the second end 66 of the axle 60 and an inner channel bore 74 between the first and second ends 62, 66 of the axle 60, shown in FIGS. 7 and 8.

Figure 5:
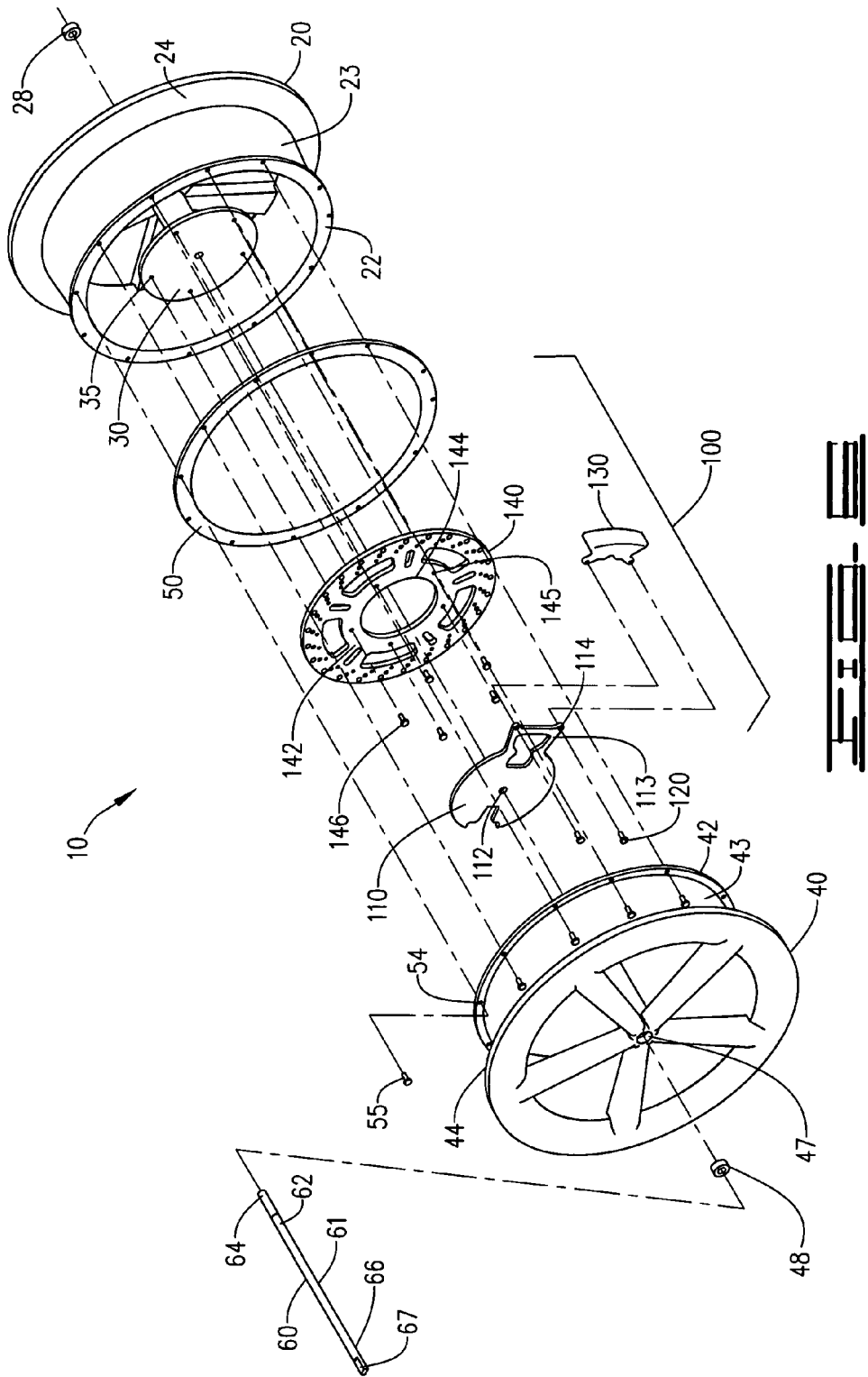
FIG. 5 is a top cross-sectional view of the wheel assembly along reference lines 5/5 of FIG. 2.
Figure 7:
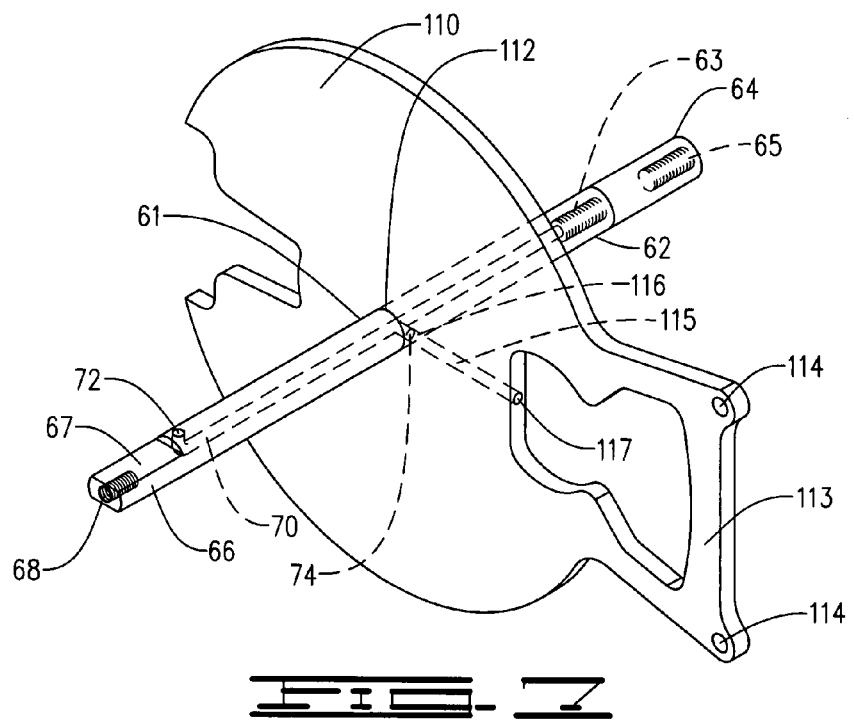
FIG. 7 is a perspective view of the axle including the brake mounting bracket of the brake assembly with the brake fluid channel in the axle aligned with the brake fluid bore of the brake mounting bracket.
Figure 8:
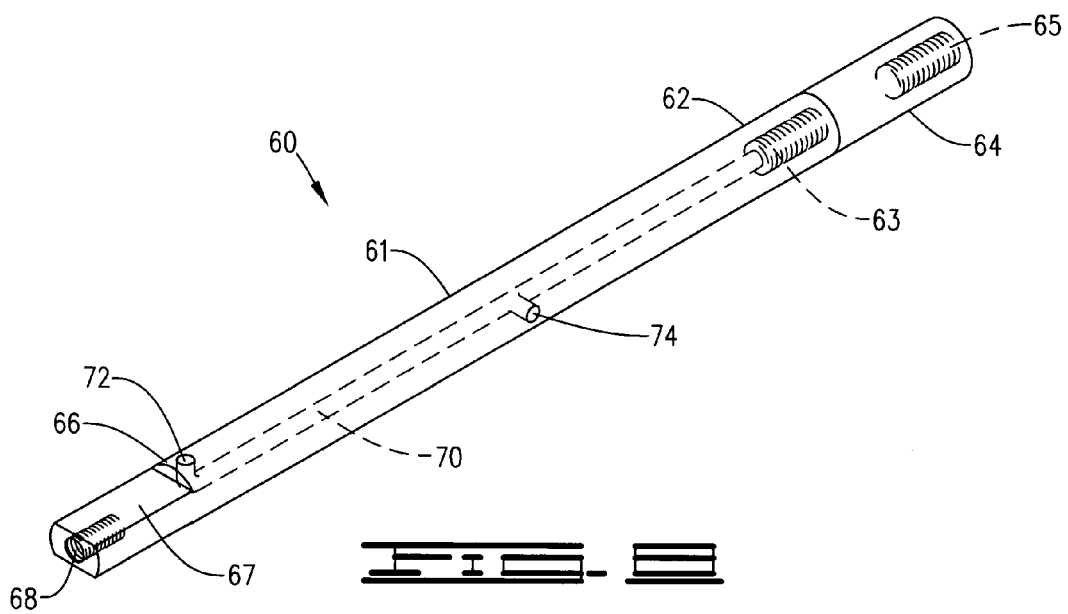
FIG. 8 is a perspective view of the axle of the wheel assembly.

The brake assembly 100, FIGS. 3, 5 and 6, further comprises a caliper mounting bracket 110 having an axle bore 112 and defining a caliper arm 113 having at least two caliper holes 114, the caliper mounting bracket 110 having a bracket fluid channel 115 from the axle bore 112 to the caliper arm 113, the bracket fluid channel 115 having an outer port 117 and an inner port 116 aligned with the inner channel port 74 of the brake fluid channel 70 of axle 60. A brake caliper 130 is attached to the caliper arm 113 by at least two caliper bolts 120, the brake caliper 130 having brake pads 132 and a brake fluid line 135 connected to the outer port 117 of the bracket fluid channel 115 in the caliper mounting bracket 110.

A brake rotor 140 is mounted to a rotor mounting plate 30 incorporated onto the hub portion 26 of the first wheel segment 20, shown in FIG. 6, the brake rotor 140 having an inner portion 142 defining a central bore 144 through which the axle 60 is placed, the inner portion 142 providing a plurality of rotor plate holes 145 attaching to a plurality of aligned rotor mounting plate holes 35 in the rotor mounting plate 30 by a plurality of rotor bolts 146. The rotor 140 is positioned between the brake pads 132 of the brake caliper 130, as shown in FIG. 5, the brake pads 132 pinching the rotor 140 between the two brake pads 132 when the caliper 130 is activated, causing friction between the brake pads 132 and the rotor 140 as would in conventional brake systems known in the art, eventually causing the rotation of the rotor 140 to cease.

In this preferred embodiment, the first and second axle bearings 28, 48 within each first and second wheel segments 20, 40 are affixed to the axle 60 allowing the first and second wheel segments 20, 40 to rotate about the axle 60 freely, while the axle 60 is affixed to the chassis or motorcycle frame A without rotation, with the caliper mounting bracket 110 also affixed to the axle 60 without rotation. The outer channel port 72 is further connected to a brake means in the vehicle to which the wheel assembly is attached, not shown, and receives brake fluid from the vehicle's master cylinder, which is transferred under pressure into the brake fluid channel 70, through the inner channel port 74 into the inner port 116 of the bracket fluid channel 115, through the outer port 117 of the bracket fluid channel 115 into the brake fluid line 135 and further to the brake caliper 130, forcing the brake caliper 130 to urge the brake pads 132 against the brake rotor 140, stopping the rotation of the brake rotor 140 and thus, the rotation of the entire wheel assembly 10.

The wheel assembly 10, including the brake assembly 100 between the respective hub portions 26, 46, is provided to locate the brake assembly 100 on the inside of a wheel assembly 10 instead of on the outside of a wheel as is known in the prior art, distracting from the appearance of the wheel. This allows for different aesthetic presentation of the wheel assembly 10 without obstruction by the brakes required on the vehicle. The hub portions 26, 46, spoke portions 25, 45, and rim portions 21, 41, may be provided in any aesthetic style without the brake rotor 140 obstructing the view of the wheel assembly 10 during operation. In the present state of the art, the chain sprocket or drive gear B would still need to located outside the wheel, FIGS. 4 and 5.

Additionally, the wheel assembly 10 with the brake assembly 100 between the two wheel segments 20, 40, further protects the brake assembly 100 from damage by road objects which could strike and damage the brake rotor 140 or brake assembly 100 during operation, each wheel segment 20, 40 protecting the brake assembly 100, including the brake rotor 140, caliper 130 and brake pads 132 while in motion Although shown in the drawing figures as a certain depiction, the wheel assembly may include any spoke pattern, rim configuration or hub orientation for different aesthetic appearances and include any wheel design or appearance. In addition, any brake assembly 100 other than the brake assembly disclosed herein may be provided between the first and second wheel segments 20, 40. It is also contemplated within the scope of the invention that lights or other electrical components may also be located between the first and second wheel segments 20, 40 which might require some modification to the disclosed structures, although not departing from the general disclosure herein. It would also be contemplated that some or all of the drive mechanism of the vehicle may be included between the first and second wheel segments, although not disclosed specifically within the claims or the drawings.

While the invention has been particularly shown and described with reference to a preferred embodiment thereof, it will be understood by those skilled in the art that changes in form and detail may be made therein without departing from the spirit and scope of the invention.

What is claimed is:

1. A vehicle and motorcycle wheel assembly comprising:
   a first wheel segment defining a rim portion having a first inner connecting flange, an inner rim surface and an outer retaining flange, a spoke portion and a hub portion having an axle bore and a first axle bearing;
   a second wheel segment defining a rim portion having a second inner connecting flange, an inner rim surface and an outer retaining flange, a spoke portion and a hub portion having an axle bore and a second axle bearing;
   an axle defining a neck, a first end providing a first axle mounting bolt bore, and a second end having a flattened portion and providing a second axle mounting bore, said first wheel segment attached to said second wheel segment along said first and second inner connecting flanges by a plurality of flange bolts attaching through a plurality of aligned flange holes in each inner connecting flange, with said axle passing through said aligned axle bores of each first and second wheel segments and said first and second axle bearings set within each axle bore, said first and second ends of said axle adapted to be attached to a chassis or motorcycle frame, with a tire applied upon said inner rim surfaces of said assembled wheel assembly between said two outer retaining flanges of said assembled first and second wheel segments; and
   a brake assembly attached upon said axle between said hub portions of said first and second wheel segments prior to assembly providing said brake assembly within said first and second wheel segments, said brake assembly further comprising: a caliper mounting bracket having an axle bore and defining a caliper arm having at least two caliper holes, said caliper mounting bracket having a bracket fluid channel from said axle bore to said caliper arm, said bracket fluid channel having an outer port and an inner port aligned with said inner channel port of said brake fluid channel of said axle, wherein said first and second wheel bearings within each first and second wheel segments are affixed to said axle allowing said first and second wheel segments to rotate about the axle freely, while said axle is a fixed to said chassis or motorcycle frame without rotation, with said caliper mounting bracket also affixed to said axle without rotation;
   a brake caliper attached to said caliper arm by at least two caliper bolts, said brake caliper having brake pads and a brake fluid line connected to said outer port of said bracket fluid channel in said caliper mounting bracket; and
   a brake rotor mounted to a rotor mounting plate incorporated onto said hub portion of said first wheel segment, said brake rotor having an inner portion defining a central bore through which said axle is placed, said inner portion providing a plurality of rotor plate holes attaching to a plurality of rotor mounting plate holes in said rotor mounting plate by a plurality of rotor bolts, wherein said brake rotor is positioned between said brake pads of said brake caliper, said brake pads pinching said brake rotor between said two brake pads when said brake caliper is compressed, causing rotation of said brake rotor to cease, thus causing the rotation of said wheel assembly to cease.

2. The wheel assembly as disclosed in claim 1, further comprising:
   said first and second inner connecting flanges include a flange plate placed between said first and second inner connecting flanges to provide an air-tight seal between said first and second inner connecting flanges to eliminate any potential air loss from said tire mounted upon said wheel assembly.

3. The wheel assembly, as disclosed in claim 1, further comprising:
   said first end of said axle providing an extension bore within which is attached a first end extension having a first axle mounting bolt bore, said neck including a brake fluid channel having an outer channel bore within said second end of said axle and an inner channel bore between said first and second ends of said axle.

* * * * *